July 24, 1956  A. G. BADE  2,755,686
MULTIPLE TAKE-OFF POWER TRANSMISSION
Filed Sept. 2, 1950  2 Sheets-Sheet 1

Inventor
ALFRED G. BADE
By
Miles Henninger
Attorney

July 24, 1956 A. G. BADE 2,755,686
MULTIPLE TAKE-OFF POWER TRANSMISSION
Filed Sept. 2, 1950 2 Sheets-Sheet 2

Inventor
ALFRED G. BADE
By
Miles Henninger
Attorney

United States Patent Office 2,755,686
Patented July 24, 1956

2,755,686

MULTIPLE TAKE-OFF POWER TRANSMISSION

Alfred G. Bade, Milwaukee, Wis., assignor to The Falk Corporation, Milwaukee, Wis., a corporation of Wisconsin Application September 2, 1950, Serial No. 182,916

12 Claims. (Cl. 74—665)

This invention relates to power drives for the operation of final drive shafts at right angles with each other and particularly to drives for sludge collectors in tanks for the clarification of liquids by sedimentation.

The clarification of liquids by sedimentation involves the use of large basins or tanks in which the liquid remains for a sufficient length of time in a relatively quiescent state to deposit the major portion of the solids suspended therein. In all of such basins or tanks, one or more collectors are provided for moving the sedimented solids to a sump from which the solids are withdrawn. When the tanks are rectangular, a number of collectors are usually provided to run longitudinally of each tank. In some instances at least, such tanks are provided with a single sludge sump and are accordingly provided with a transversely moving collector or cross-collector by which the sludge collected by several main or longitudinal collectors, is brought to the single sump.

A single drive unit should be provided for all of the sludge collectors in each tank, to minimize the machinery required. Several longitudinal collectors may be operated from a single main shaft but the cross-collector must be operated from a shaft extending at right angles to the main shaft. Because of the diversity in tank constructions and the various ways in which the sedimented sludge is collected, it is desirable to provide the drive for the collectors with a final drive unit in which both the direction of rotation of the shafts and the relative speeds of the shafts may be varied.

Because of the diversity of installations and conditions of operation thereof, it should also be possible to vary the drive by varying the size of the motor and/or the speed reducing gearing between the motor and the final drive in the minimum of time and without disturbance of the final drive. In some instances it is even desirable to make such change in operating installations with the minimum interruption in operation of such installation.

Because of the fact that the pull on the longitudinal collector shaft may be concentrated on one end of the shaft, it is necessary to provide a drive in which the stresses will be relatively uniformly distributed in only one of the drive sub-assembly casings regardless of the conditions of operation and in which the stresses will not be transmitted to the several gear trains in the drive either as a whole or individually. Hence, a single casing should support all other casings of the drive in overhung relation, and such casing must be sufficiently rigid to resist such stresses, while the shafts therein are supported in relatively large bearings which are well lubricated and readily changed.

When the longitudinal collector pull is concentrated on one end of the main shaft, such pull may be of the order of 10,000 pounds which tends to tip the final drive unless a minimum overhung moment arm for the chain sprockets is provided. Hence, the chain sprockets on such shaft should be within the area defined by the axes about which the drive might tip under concentrated load, and without enlarging the base beyond the limits set by sanitation regulations.

It is therefore an object of the present invention to provide a drive from which power is taken at a plurality of points from shafts extending in at least two directions from the casing and in which the direction of rotation of some of the shafts and the relative speeds of such shafts may be readily varied.

Another object of the invention is to provide a drive for the delivery of power at a plurality of different points and in which stresses other than the normal operating stresses, are not transmitted to the several gear trains in the drive.

Another object of the invention is to provide a drive for the several sludge collectors of a sludge sedimentation installation, in which a single casing supports the other portions of the drive in overhung relation to avoid stressing such other drive portions especially upon the occurrence of unbalanced loads on the final drive, and to allow interchanging of the driving means and the speed reducer as required by operating conditions and without change in the final drive.

Another object of the invention is to provide a drive for the solids collectors in solids sedimentation installations, in which the parts are so related as to simplify adaptation to and adjustment to varying operating conditions and to simplify maintenance.

A further object of the invention is to provide a final drive for the sludge collectors of a liquids-solids separation system in which the longitudinal and cross-collectors for the sedimented sludge may be operated at different speeds and in which the speeds of the cross-collector shafts may be readily varied.

And a further object of the invention is to provide an improved power transmitting mechanism of the character above indicated which is simple and compact, readily adustable to varying operating conditions, efficient in operation and which may be manufactured at relatively low cost.

Objects and advantages other than those above set forth will be apparent from the following description when read in connection with the accompanying drawing in which.

Figure 1:
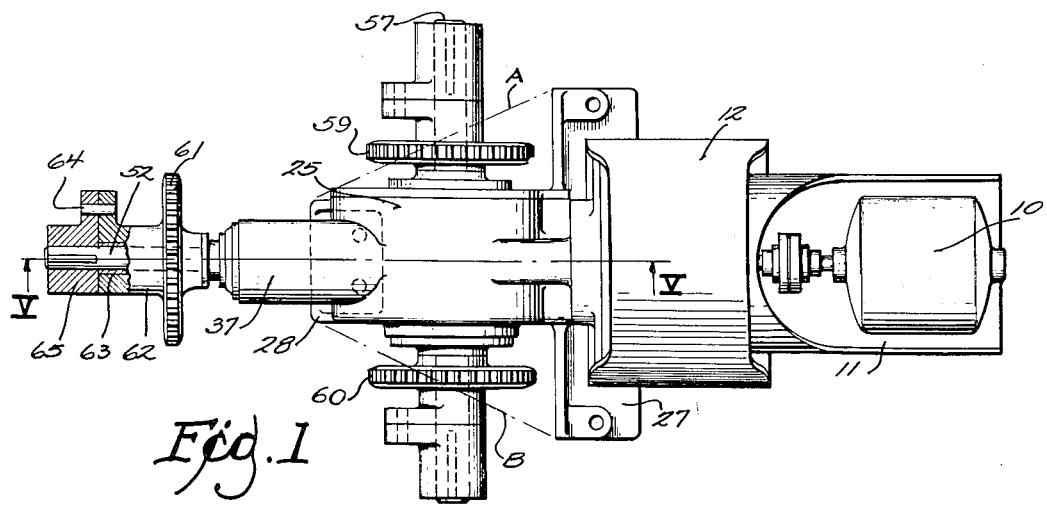
Fig. 1 is a top view of a drive for delivery of power at a plurality of points and in which one of the power delivery shafts extends at a right angle to another power delivery shaft.
Figure 2:
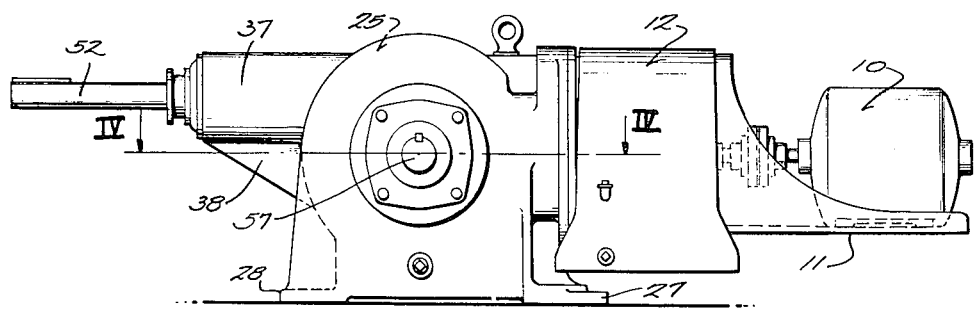
Fig. 2 is a side view of the drive shown in Fig. 1.
Figure 3:
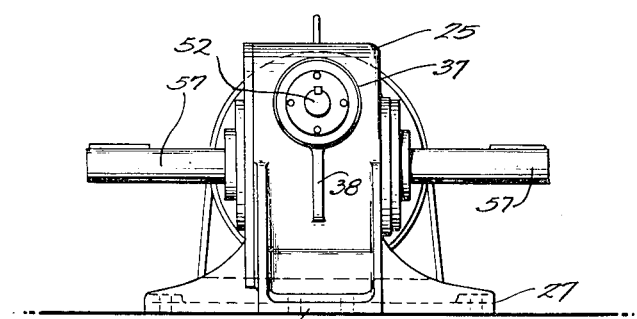
Fig. 3 is a left hand end view of the drive shown in Figs. 1 and 2.

Generally, the structure of the present drive includes means such as an electric motor for supplying power, a gear train unit for delivering power from the motor at a reduced speed and a final drive unit for delivering power at a plurality of points by way of two shafts, one of the shafts extending at a right angle to the other shaft. The final drive unit includes a casing in which is mounted gearing for driving both of the final drive shafts, the one shaft extending from the casing at both ends whereby power is delivered to at least three points. The second shaft is so connected with the final drive gearing that the speed of the second shaft relative to the first shaft may be easily varied. The direction of rotation of one shaft is readily changed by shifting the position of one of the final drive unit gears in one embodiment of the invention.

Referring particularly to the drawings by reference numerals in which like parts are indicated by like numerals, 10 designates an electric motor to which power is supplied in the usual manner. It will be understood that the direction of rotation of the motor is constant unless the wiring of the motor is reversed as is well known. The motor is supported on a bracket 11 extending from the casing of a speed reducer unit generally designated 12 in which is mounted a speed reducing gear train, only the final gear of such train being shown in Fig. 5. The speed reducer casing includes a single top and side plate 13 and two end plates of which only plate 14 is shown, and a bottom plate 16. The last gear of the speed reducing train is indicated at 17 in Fig. 5. Both the motor and the speed reducer are standard articles of commerce and need not be further described.

Figure 4:
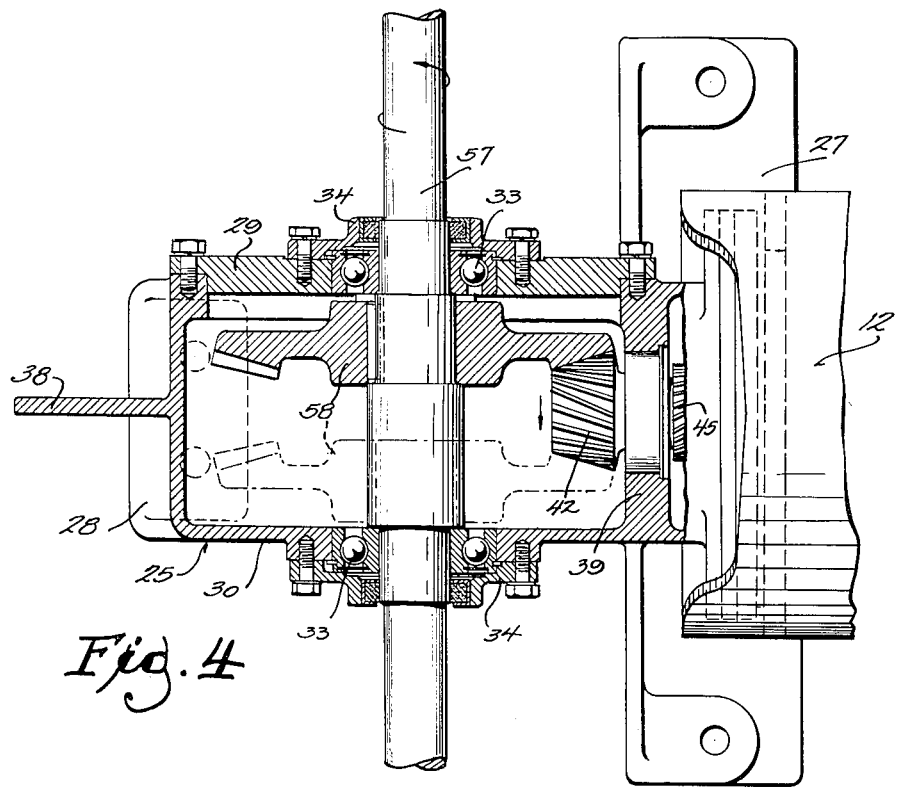
Fig. 4 is an enlarged view of a portion of the drive shown in Figs. 1, 2 and 3 and is partially in section on the line IV—IV of Fig. 2.
Figure 5:
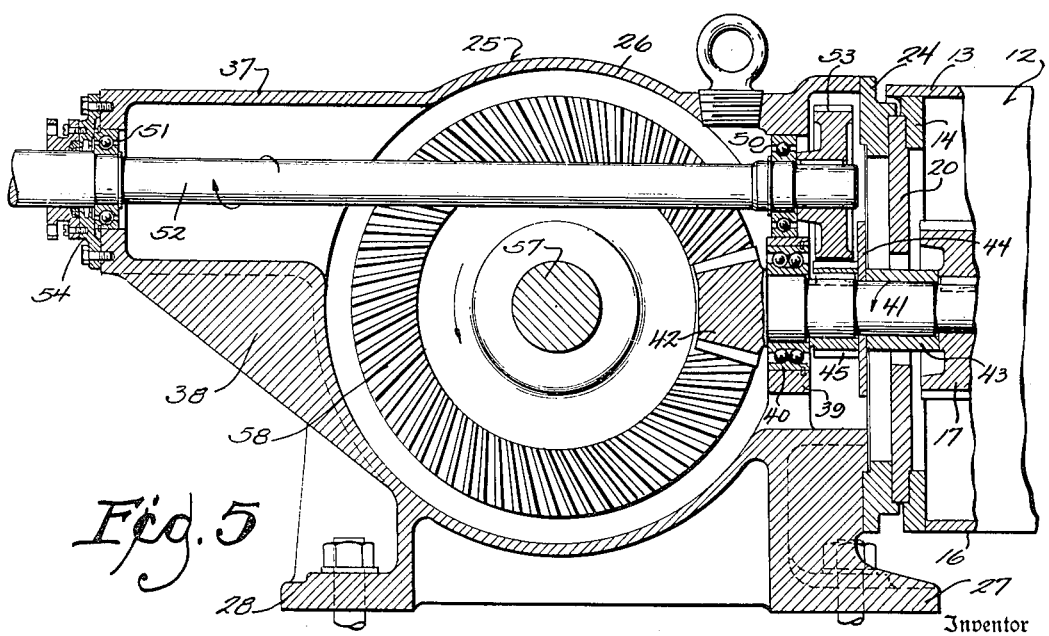
Fig. 5 is an enlarged view of a portion of the drive shown in Figs. 1, 2 and 3 and is partially in section on the plane of line V—V of Fig. 1.

Referring to Figs. 4 and 5, it will be seen that the speed reducer casing end plate 14 is in the nature of a rim or flange extending inwardly of the bottom and side plates and has fixed thereon an adapter plate 20 which is shaped to be seated on and retained by an end plate 24 of the final drive unit generally designated 25. It will be understood that plate 24 is removably fixed to the main casing portion 26 of unit 25 to provide a connection of adequate rigidity and strength for supporting the speed reducer unit and motor final drive casing, as shown in Figs. 4 and 5.

The final drive major casing portion 26 has a laterally and end-wise extending foot 27 at one end thereof extending partially under the speed reducer. The casing portion 26 also has a forwardly extending foot 28 at the other end of such casing and of only the casing width. It will be seen by reference to Fig. 1 that lines A, B joining the non-adjacent corners of such feet which are farthest laterally from one axis of the drive, substantially include the main sprockets of the final drive unit for driving the longitudinal collectors. Such lines severally indicate the axes about which the drive tends to tip when all the main collector pull is concentrated on one or the other end of the main collector shaft.

One side of the final drive casing portion 26 is formed by a readily removable plate 29 which has an aperture in line with an aperture in the other casing side 30, the apertures receiving readily removable and replaceable bearings 33 retained in the casing by cap plate and seal structures 34. The plate 29 is of such size that the gearing and other parts supported within the final drive casing may be inserted through the opening to be closed by such plate. A hollow, substantially cylindrical extension 37 from the casing portion 26, is supported by a web 38 aligned with the longitudinal axis of the overhanging speed reducer and motor. The web extends toward the casing foot 28 and transmits thereto the stresses on the casing extension.

A wall 39 is formed in the final drive casing to support a number of bearings including bearing 40 in which is mounted a shaft 41 carrying the final gear 17 of the speed reducer and a bevel pinion 42 within the final drive casing. A sleeve 43 on the shaft 41 spaces an oil slinger 44 and a pinion 45 between the bearing 40 and the gear 17. A second bearing 50 is mounted in the wall 39 and a bearing 51 is mounted in the end of the casing extension 37 to receive a shaft 52 for receiving a gear 53 in readily removable relation and for meshing with the pinion 45. The bearing 51 is retained by a plate and seal of the usual construction and indicated at 54 and both bearings 50 and 51 are preferably of the permanently sealed grease packed type. The speed at which the shaft 52 is rotated may be readily changed merely by changing the ratio of gears 45 and 53.

Bearings 33 in the casing plate 29 and in casing side 30 receive a shaft 57 which extends from both sides of the casing for the mounting thereon of chain sprockets. The shaft 57 has mounted thereon a bevel gear 58 meshing with the bevel pinion 42. Hence, assuming that the bevel pinion 42 rotates in the direction of the arrow shown in Fig. 4, the shaft 57 will be rotated in the direction of the arrow shown thereon in Fig. 5. The direction of rotation of shaft 52 is indicated by the arrow thereon in Fig. 5.

It will be observed that shaft 57 extends from the final drive casing transversely of the longitudinal axis of the motor and speed reducer units and that shaft 52 is parallel to but offset from such axis and above the level of lubricant in the final drive casing 24—30. When the present drive is to be used in connection with a sedimentation tank, sprockets 59, 60 on shaft 57 drive chains for operating the longitudinally moving sludge collectors and a sprocket 61 (see Fig. 1) mounted on the shaft 52 drives a chain for the operation of a cross- or transversely-moving sludge collector, the collector structures being well known and not shown. The sprockets are severally formed with extended hubs 62 (see Fig. 1) and have a bushing 63 therein for mounting on the shafts. Such hubs are joined by a shear pin 64 with a sleeve 65 keyed on the shaft. Excessive shocks on the collectors shear one or another of the pins 64 and avoid damage to the final drive gearing.

The downward pull on the several longitudinal collectors shaft is of the order of 5000 pounds but under some circumstances one such collector may be entirely unloaded and double the usual load may be applied to the one end of the main or longitudinal collector shaft 57. (The pull on the cross-collector shaft is of the order of 700 pounds and such pull is relatively constant.) The final drive casing feet 27, 28 are so placed and spaced that the chain pull is midway between the feet and substantially within the area of the triangle defined by the axes A and B (in Fig. 1) which minimizes the moment arm of the sprockets. Because the chain pull is midway between the feet and because the sprocket moment arm is minimized, there is a minimum tipping force on the final drive casing even though all of the load on the main collector acts on only one sprocket.

When it is desired to change the direction of rotation of the shaft 57, the shaft 57 and the bevel gear 58 need merely be removed from the casing and replaced in the casing but with the shaft ends reversed so that the bevel gear is now in the dotted line position shown in Fig. 4. Upon replacement of the shaft 57 to mesh the bevel gears 42 and 58, the direction of rotation of the shaft 57 is reversed.

It will be seen from the above description that overhanging of the speed reducer unit and motor from the final drive unit relieves the speed reducer and motor from operating stresses which were heretofore transmitted thereto. Any one of a number of different speed reducers may be readily mounted on the final drive casing and any one of a number of motors may be used. The cross-collector shaft is driven by a simple and easily selective or variable gear train so that the speed of that shaft is readily adjusted as desired and such gearing is placed to require the minimum of space in the final drive casing. The final drive casing feet and sprockets are so related that the chain pull of the main collectors is midway between such feet and with substantially no sprocket moment arms outside of the area defined by points of such feet. The tendency toward tipping of the final drive casing upon concentration of the main load on one side, is therefore substantially eliminated. The direction of rotation of the main shaft is easily varied with the minimum possibility of misaligning of parts and the final drive unit is readily assembled and disassembled from one side of the casing.

Although but one embodiment of the present invention has been illustrated and described, it will be apparent that various changes and modifications may be made therein without departing from the invention as defined in the appended claims.

I claim:

1. In a drive for delivering power to a plurality of points, a casing having foot plates of different lengths at the ends thereof, a shaft extending through the casing, and power take-off means mounted externally of the casing and on each end of the shaft, the power take-off means being located between the foot plates and substantially within lines transversely of the shaft and severally between points at the ends of the foot plates to minimize the tendency toward tipping of the casing upon unbalanced loading of the power take-off means.

2. In a drive for delivering power to a plurality of points, a casing having foot plates of different lengths at the ends thereof, a shaft extending through the casing, and power take-off means mounted externally of the casing and on each end of the shaft, the power take-off means being located substantially midway between the foot plates and substantially within lines connecting non-adjacent end corners of the several foot plates farthest laterally from the casing to minimize the tendency toward tipping of the casing upon unequal loading of the several power take-off means.

3. In a geared drive for reversibly delivering power, a casing adapted to be self-supporting, a gear pinion extending into the casing for transmitting power thereinto, a plurality of shafts in the casing for severally delivering power, and a gear on one of the shafts and in mesh with the pinion, end for end positioning of the said one shaft together with the gear thereon from its prior position shifting the meshing point of the gears 180° in space and reversing the direction of motion of the said one shaft.

4. In a geared drive for plural sludge collectors in a sedimentation tank, a casing having one side substantially open, a removable plate for closing the open casing side, a pinion extending into the casing for transmitting power thereinto, a plurality of shafts mounted in the casing for severally delivering power to the sludge collectors, a gear fixed on one of the shafts and meshing with the pinion, the opening in the casing side being of sufficient size for removing and inserting the said one shaft and the gear fixed thereon for shifting the meshing point of the gears 180° in space and thereby reversing the direction of rotation of the shaft.

5. In a geared drive for sludge collectors in a sedimentation tank, a casing adapted to be self-supporting and having one side thereof substantially open, a bevel pinion extending into the casing on substantially an axis thereof for transmitting power thereinto, a plurality of shafts mounted in the casing and extending therefrom for severally delivering power to the sludge collectors, one of the shafts being on an axis of the casing intersecting the first said axis, and a bevel gear fixed on the said one shaft and meshing with the bevel pinion, the said one shaft and the gear thereon being removable through the open casing side and invertible as a unit to end for end position from a prior position for shifting the meshing point of the gears 180° in space and reversing the direction of rotation of the shaft.

6. In a geared drive for a plurality of shafts at right angles to each other, a casing defining a main chamber and a hollow extension therefrom, the casing having an opening in one side of the main chamber, a readily detachable plate for closing the casing side opening, a reversible first driven shaft rotatably mounted in the plate and in the casing side wall opposite thereto and having both ends extending from the casing for the delivery of power from each of the shaft ends, a reversible first driven gear mounted on the first driven shaft within the casing main chamber, a second driven shaft rotatably mounted in and projecting from the casing and at a right angle to the first driven shaft, a second driven gear mounted on the second driven shaft within the casing, a driving shaft extending into the casing, and a plurality of gears mounted on the driving shaft for severally meshing with the driven gears, the casing opening being of a size for removal and replacement of the first driven shaft and the gear thereon whereby the gear is re-engageable with the driving gear therefor for reversing direction of rotation of the first driven shaft.

7. In a geared drive for a plurality of shafts at right angles to each other, a casing defining a main chamber and a hollow extension therefrom above the horizontal plane through the center of the main chamber, the casing having an opening in one side of the main chamber, a readily detachable plate for closing the casing side opening, a reversible first driven shaft rotatably mounted centrally in the plate and in the casing side wall opposite thereto and having both ends extending from the casing for the delivery of power from each of the shaft ends, a reversible first driven gear mounted on the first driven shaft within the casing main chamber, a second driven shaft rotatably mounted in and projecting from the casing and at a right angle to the first driven shaft, a second driven gear mounted on the second driven shaft within the casing, a driving shaft extending into the casing, and a plurality of gears mounted on the driving shaft for severally meshing with the driven gears, the casing opening being of a size for removal and replacement of the first driven shaft and the gear thereon whereby the gear is re-engageable with the driving gear therefor for reversing direction of rotation of the first driven shaft.

8. In a geared drive for a plurality of shafts at right angles to each other, a casing defining a main chamber and a hollow extension therefrom, the casing having an opening in one side of the main chamber, a readily detachable plate for closing the casing side opening, a reversible first driven shaft rotatably mounted in the plate and in the casing side wall opposite thereto and having both ends extending from the casing for delivery of power from each of the shaft ends, a bevel gear mounted on the first driven shaft within the casing main chamber, a second driven shaft rotatably mounted in and extending from the casing through the extension thereof and at a right angle to the first driven shaft, a driven gear mounted on the second driven shaft within the casing, a driving shaft extending into the casing with its center line in the plane of the center line of the first driven shaft, and a plurality of gears mounted on the driving shaft for severally meshing with the driven gears, one of the driving gears being a bevel gear meshing with the driven bevel gear, the casing opening being of a size for removal of the first driven shaft and its bevel gear and replacement thereof in either of two positions for rotation of the shaft in either direction dependent upon the position of the driven bevel gear relative to the driving bevel gear.

9. In a geared drive for a plurality of shafts at right angles to each other, a casing defining a main chamber and a hollow extension therefrom, the casing having an opening in one side of the main chamber, a readily detachable plate for closing the casing side opening, a reversible first driven shaft rotatably mounted in the plate and in the casing side wall opposite thereto and having both ends extending from the casing for the delivery of power from each of the shaft ends, a reversible first driven gear mounted on the first driven shaft within the casing main chamber, a second driven shaft rotatably mounted in and projecting from the casing and at a right angle to the first driven shaft, a second driven gear mounted on the second driven shaft within the casing, a driving shaft extending into the casing, and a plurality of gears mounted on the driving shaft for separately driving the driven gears and shafts, one of the driven shafts being radially offset from the other driven shaft whereby the speed of either driven shaft may be varied independently of the other driven shaft.

10. A driving unit of the character described comprising the combination of a housing, two radially offset output shafts journalled therein in radially offset relation, one of said shafts extending transversely through and beyond said housing, the other of said shafts extending longitudinally of and beyond said housing, an input shaft extending into said housing, gearing connecting said input shaft to said transverse output shaft, said gearing including a bevel gear reversibly mounted to permit reversing the direction of operation of said transverse shaft, and separate gearing connecting said input shaft with said longitudinal output shaft, said last named gearing including gears replaceable to change the rate of operation of said longitudinal shaft, whereby the rate and direction of operation of said output shafts may be varied relative to each other.

11. A driving unit of the character described comprising the combination of a housing having a relatively narrow extension projecting from one end thereof, an output shaft journalled in and extending through and beyond said extension, a second output shaft extending transversely through and beyond said housing, a motor driven speed reducer attached to the other end of said housing and having an output shaft projecting into the latter, gearing through which said first named output shaft is driven from said last named shaft, and separate gearing through which said second output shaft is driven from said last named shaft.

12. A driving unit of the character described comprising a housing, an output shaft journalled therein and projecting from one end thereof, a second output shaft journalled in and projecting from the sides of said housing, a motor driven speed reducer mounted on and supported by the opposite end of said housing and having an output shaft projecting into said housing, gearing through which said first named output shaft is driven from said last named shaft, separate gearing through which said second output shaft is driven from said last named shaft, and mounting means for said housing through which the transverse loads imposed on said first and second output shafts are sustained independently of said motor driven speed reducer.

References Cited in the file of this patent

UNITED STATES PATENTS

| | | |
|---|---|---|
| 1,890,685 | Johnson | Dec. 13, 1932 |
| 1,953,360 | Moree | Apr. 3, 1934 |
| 2,136,400 | Steindorf | Nov. 15, 1938 |
| 2,278,606 | Alexander et al. | Apr. 7, 1942 |
| 2,292,855 | Wileman | Aug. 11, 1942 |
| 2,307,556 | Wileman | Jan. 12, 1943 |
| 2,311,830 | Hawley | Feb. 23, 1943 |
| 2,330,136 | Nardone | Sept. 21, 1943 |
| 2,347,352 | Lapsley | Apr. 25, 1944 |

FOREIGN PATENTS

| | | |
|---|---|---|
| 473,229 | Great Britain | Oct. 8, 1937 |
| 643,409 | France | May 16, 1928 |
| 877,791 | France | Sept. 14, 1942 |
| 909,041 | France | Apr. 25, 1946 |